(12) United States Patent
den Doelder et al.

(10) Patent No.: US 9,828,496 B2
(45) Date of Patent: Nov. 28, 2017

(54) LOW DENSITY ETHYLENE-BASED POLYMER COMPOSITIONS WITH HIGH MELT STRENGTH AND MID-HIGH DENSITY CONTROL

(71) Applicant: Dow Global Technologies LLC, Midland, MI (US)

(72) Inventors: Cornelis F. J. den Doelder, Terneuzen (NL); Karl Zuercher, Samstagern (CH); Otto J. Berbee, Hulst (NL); Jian Wang, Freeport, TX (US); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 158 days.

(21) Appl. No.: 14/889,221

(22) PCT Filed: May 21, 2014

(86) PCT No.: PCT/US2014/038946
§ 371 (c)(1),
(2) Date: Nov. 5, 2015

(87) PCT Pub. No.: WO2014/190041
PCT Pub. Date: Nov. 27, 2014

(65) Prior Publication Data
US 2016/0090476 A1    Mar. 31, 2016

Related U.S. Application Data

(60) Provisional application No. 61/826,286, filed on May 22, 2013.

(51) Int. Cl.
| C08L 23/06 | (2006.01) |
| C09D 123/06 | (2006.01) |
| C08J 9/00 | (2006.01) |

(52) U.S. Cl.
CPC ............. *C08L 23/06* (2013.01); *C08J 9/0061* (2013.01); *C09D 123/06* (2013.01); *C08J 2323/06* (2013.01); *C08J 2423/06* (2013.01); *C08L 2203/16* (2013.01); *C08L 2205/025* (2013.01); *C08L 2207/066* (2013.01)

(58) Field of Classification Search
CPC ................ C08L 23/06; C08L 2203/16; C08L 2205/025; C09D 123/06; C08J 2323/06
See application file for complete search history.

(56) References Cited

U.S. PATENT DOCUMENTS

| 3,125,548 | A | 3/1964 | Anderson et al. |
| 4,339,507 | A | 7/1982 | Kurtz et al. |
| 6,333,387 | B1 | 12/2001 | Takahashi et al. |
| 6,774,190 | B1 | 8/2004 | Takahashi et al. |
| 7,776,987 | B2 | 8/2010 | Oswald et al. |
| 8,729,186 | B2 | 5/2014 | Berbee et al. |
| 9,120,880 | B2 | 9/2015 | Zschoch et al. |
| 9,228,036 | B2 | 1/2016 | Berbee et al. |
| 9,334,348 | B2 | 5/2016 | Berbee et al. |
| 9,394,389 | B2 | 7/2016 | Berbee et al. |
| 2007/0225445 | A1 | 9/2007 | Nguyen et al. |
| 2012/0028017 | A1* | 2/2012 | Saraf ....................... B32B 27/32 428/218 |
| 2012/0252990 | A1 | 10/2012 | Berbee et al. |
| 2012/0316284 | A1* | 12/2012 | Wang .................. C08L 23/0815 524/528 |
| 2013/0164552 | A1* | 6/2013 | Wang .......................... C08J 5/18 428/523 |
| 2014/0134364 | A1* | 5/2014 | Effler .......................... C08J 5/18 428/35.7 |
| 2015/0132514 | A1* | 5/2015 | Wang .................. B29C 47/0026 428/35.7 |
| 2016/0068700 | A1* | 3/2016 | Zuercher ................. C08L 23/06 525/240 |
| 2016/0090476 | A1 | 3/2016 | den Doelder et al. |

FOREIGN PATENT DOCUMENTS

| EP | 0052889 B1 | 5/1986 |
| EP | 0435624 A1 | 7/1991 |
| EP | 2123707 B1 | 10/2010 |
| WO | 2015/100302 A1 | 7/2015 |
| WO | 2015/100318 A1 | 7/2015 |
| WO | 2015/100351 A1 | 7/2015 |
| WO | 2015/200426 A1 | 12/2015 |

OTHER PUBLICATIONS

PCT/US2014/038946, International Search Report and Written Opinion dated Aug. 20, 2014.
PCT/US2014/038946, International Preliminary Report on Patentability dated Dec. 3, 2015.
EP17167818.8, Extended Search Report dated Jun. 9, 2017.

* cited by examiner

*Primary Examiner* — Kara B Boyle

(57) ABSTRACT

The invention provides a composition comprising a first ethylene-based polymer, formed by a high pressure, free-radical polymerization process, and a second ethylene-based polymer, formed by a high pressure, free-radical polymerization process, such composition comprising the following properties: a) a melt index (I2) from 2.0 to 10 dg/min; b) a density from 0.922 to 0.935 g/cc; and wherein the second ethylene-based polymer is present in an amount from 60 to 95 weight percent, based on the sum of the weight of the first polymer and the second polymer; and wherein the second ethylene-based polymer has a density greater than, or equal to, 0.924 g/cc; and wherein the first ethylene-based polymer has a melt index less than 2.5 dg/min.

12 Claims, 4 Drawing Sheets

LOW DENSITY ETHYLENE-BASED POLYMER COMPOSITIONS WITH HIGH MELT STRENGTH AND MID-HIGH DENSITY CONTROL

REFERENCE TO RELATED APPLICATIONS

This application claims the benefit of U.S. Provisional Application 61/826,286, filed on May 22, 2013.

BACKGROUND

Low density polyethylene (LDPE) resins for extrusion coating and extrusion lamination on paper, board, aluminum, etc., are designed with broad MWD (molecular weight distribution) and low extractables. In extrusion coating applications, the following product and application properties are, among others, of importance: coating performance at variable processing speeds, adhesion to the substrate, barrier properties, and seal formation. The coating performance at variable processing speeds will depend mainly on the viscoelastic properties of the polymer, while adhesion, barrier, and sealing properties will also depend, in addition to the viscoelastic properties, on the density, crystallinity, and functionality of the polymer.

Typically LDPE resins with broad MWD are made using autoclave reactors or a combination of autoclave and tube reactors. Broad MWD resins can be achieved in autoclave reactors by promoting long chain branching, and through the inherent residence time distribution, by which molecules will undergo shorter (low molecular weight) or longer (high molecular weight) growth paths.

International Application No. PCT/US12/064284, filed Nov. 9, 2012, describes LDPE resins made using tubular reactors that are suitable for extrusion coating. However, these resins are designed for the lower density end of the application space for extrusion coating (e.g. less than 0.920 g/cc). For the higher and/or medium density segment of extrusion coating applications, autoclave-based LDPEs are still required. Alternatively, blends of high melt strength LDPE of lower density with LLDPE or HDPE can be used to achieve higher overall density.

There is a need for compositions that comprise high-pressure ethylene-based polymers, such as LDPE polymers, to achieve a good balance of adhesion and substrate-polymer delamination. The presence of other polymer types, such as linear-type polymers, could compromise this balance, due to presence of anti-oxidants, and/or due to resulting mechanical properties that will promote undesired delamination.

There is also a need for flexibility in LDPE component selection to achieve higher density and good coating performance, without having to select exclusively an autoclave-based resin, and there is a need to achieve even higher overall density, e.g., for improved barrier properties, at good coating properties, that is also typically not reachable by only using a single autoclave-based resin (>0.926 g/cc). Standard autoclave (AC) coating grades in the "0.920-0.924 g/cc" density range do exist commercially. There is a need for new compositions that can be used to replace conventional compositions containing these "lower conversion AC resins," which are costly to produce.

U.S. Publication 2007/0225445 describes blends of one AC with one tubular LDPE product. Both types of products have a broad MWD, high melt strength, and therefore a lower density. Data at different blend ratios show overall density to be low. Furthermore the melt index range of the tubular and the autoclave products should comply with, respectively, 4 to 10 g/10 min and 3 to 9 g/10 min ranges. These melt index ranges, in combination with blend composition ranges from 75/25 to 25/75, do not allow the use of a high density resin with a low melt elasticity, while maintaining in the final blend high melt elasticity to ensure good coating performance.

International Publication WO 2011/075465 describes the manufacturing and application of autoclave based resins, which have higher densities, and can be extrusion coated; however neck-in performance can be continued to be improved upon. The present invention results in even higher density capability at superior extrusion coating processing performance, with no compromise to neck-in performance.

EP2123707B1 describes a blend of majority of tubular with 2-30 wt % of autoclave of MI>2.5, with certain viscosity relations. The use of a higher melt index, high melt strength blend resin results in blends with lower melt strength extrusion coating performance behavior and reduces maximum density capability.

There remains a need for new ethylene-based polymer compositions comprising an optimum balance of processing, density, crystallinity, and end-use performance in extrusion coatings. This need and others have been met by the following invention.

SUMMARY OF INVENTION

The invention provides a composition comprising a first ethylene-based polymer, formed by a high pressure, free-radical polymerization process, and a second ethylene-based polymer, formed by a high pressure, free-radical polymerization process, such composition comprising the following properties:

a) a melt index (I2) from 2.0 to 10 dg/min;
b) a density from 0.922 to 0.935 g/cc; and wherein the second ethylene-based polymer is present in an amount from 60 to 95 weight percent, based on the sum of the weight of the first ethylene-based polymer and the second ethylene-based polymer; and wherein the second ethylene-based polymer has a density greater than, or equal to, 0.924 g/cc; and wherein the first ethylene-based polymer has a melt index less than 2.5 dg/min.

BRIEF DESCRIPTION OF THE DRAWINGS

FIG. 1A represents a general flow scheme. FIG. 1B provides more detail of the discharge of the primary compressor system.

DETAILED DESCRIPTION

Figure 1A:
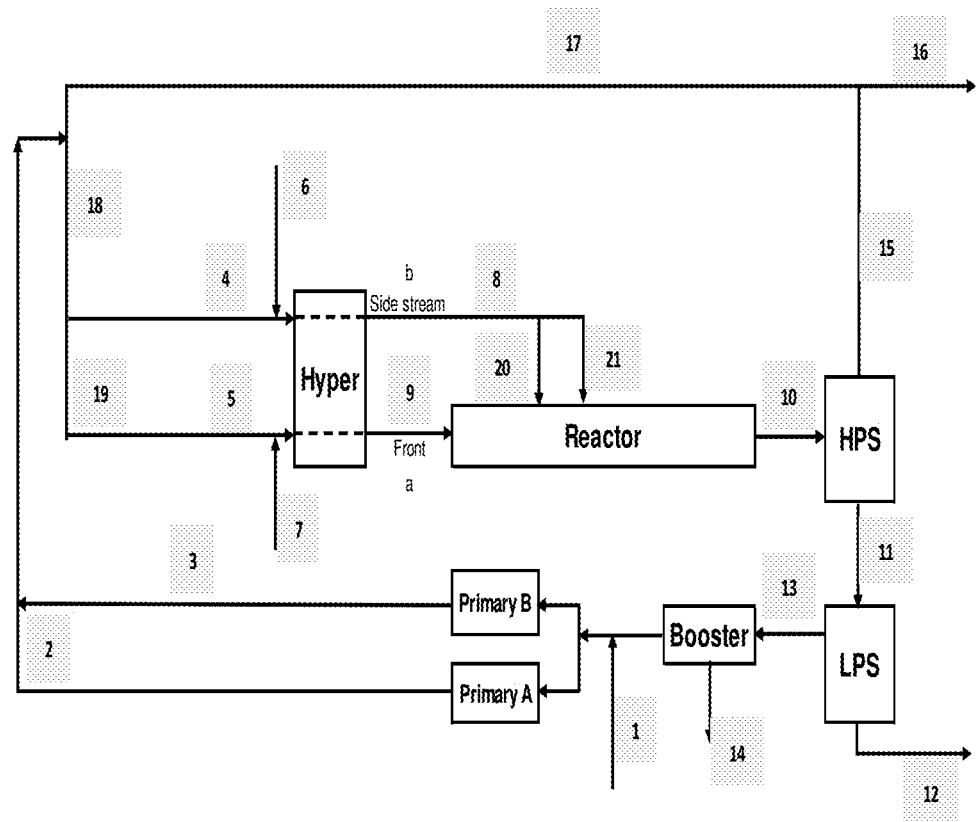
FIGS. 1A and 1B are schematics of a polymerization flow schemes.

As discussed above, the invention provides a composition comprising a first ethylene-based polymer, formed by a high pressure, free-radical polymerization process, and a second ethylene-based polymer, formed by a high pressure, free-radical polymerization process, such composition comprising the following properties:

a) a melt index (I2) from 2.0 to 10 dg/min;
b) a density from 0.922 to 0.935 g/cc; and wherein the second ethylene-based polymer is present in an amount from 60 to 95 weight percent, based on the sum of the weight of the first ethylene-based polymer and the second ethylene-based polymer; and wherein the second ethylene-based polymer has a density greater than, or equal to, 0.924 g/cc; and wherein the first ethylene-based polymer has a melt index less than 2.5 dg/min.

An inventive composition may comprise a combination of two or more embodiments as described herein.

The first ethylene-based polymer may comprise a combination of two or more embodiments as described herein.

The second ethylene-based polymer may comprise a combination of two or more embodiments as described herein.

In one embodiment, the first ethylene-based polymer has a melt index less than, or equal to, 2.4 dg/min, further less than, or equal to, 2.3 dg/min, further less than, or equal to, 2.2 dg/min, further less than, or equal to, 2.1 dg/min.

In one embodiment, the first ethylene-based polymer has a melt index less than, or equal to, 2.0 dg/min, further less than, or equal to, 1.9 dg/min, further less than, or equal to, 1.8 dg/min.

In one embodiment, the first ethylene-based polymer has a melt index less than, or equal to, 1.7 dg/min, further less than, or equal to, 1.6 dg/min, further less than, or equal to, 1.5 dg/min.

In one embodiment, the first ethylene-based polymer has a Melt Strength (190° C.) greater than, or equal to, 15 cN, further greater than, or equal to, 17 cN.

In one embodiment, the second polymer density is greater than, or equal to, 0.9245 g/cc, further greater than, or equal to, 0.9250 g/cc, further greater than, or equal to, 0.9260 g/cc (1 cc=1 $cm^3$).

In one embodiment, the difference in the density of the second polymer and the density of the first polymer is greater than, or equal to, 0.0060 g/cc, further greater than, or equal to, 0.0065 g/cc, further greater than, or equal to, 0.0070 g/cc, further greater than, or equal to, 0.0075 g/cc.

In one embodiment, the ratio of the density of the second polymer to the density of the first polymer is greater than, or equal to, 1.005, further greater than, or equal to, 1.006, further greater than, or equal to, 1.007.

In one embodiment, the second ethylene-based polymer has a melt index (I2) from 2.0 to 50.0 dg/min, further from 2.5 to 40.0 dg/min, further from 3.0 to 30 dg/min.

In one embodiment, the first ethylene-based polymer is a polyethylene homopolymer.

In one embodiment, the second ethylene-based polymer is a polyethylene homopolymer.

In one embodiment, the second ethylene-based polymer is present in an amount from 70 to 92 weight percent, further from 80 to 90 weight percent, based on the sum of the weight of the first polymer and the second polymer.

In one embodiment, the composition has a melt index (I2) from 2.5 to 10 dg/min, further from 3.0 to 10 dg/min.

In one embodiment, the composition has a melt index (I2) from 2.0 to 9.0 dg/min, further from 2.0 to 8.5 dg/min, further from 2.0 to 8.0 dg/min.

In one embodiment, the composition has a density from 0.922 to 0.932 g/cc, further from 0.922 to 0.930 g/cc (1 cc=1 $cm^3$).

In one embodiment, the composition has a density from 0.923 to 0.935 g/cc, further from 0.923 to 0.932 g/cc, further from 0.923 to 0.930 g/cc.

In one embodiment, the composition has a density from 0.924 to 0.935 g/cc, further from 0.924 to 0.932 g/cc, further from 0.924 to 0.930 g/cc.

In one embodiment, the composition has a hexane extractable content less than 5.5 weight percent.

In one embodiment, the composition has a hexane extractable content less than 4.0 weight percent.

In one embodiment, the composition has a hexane extractable content less than 3.3 weight percent.

In one embodiment, the composition has a hexane extractable content less than 2.6 weight percent.

The invention also provides an article comprising at least one component formed from an inventive composition.

In one embodiment, the article is selected from coatings (including extrusion coatings for food packaging and wire and cable applications), films, foams (including cork applications and packaging applications), laminates, fibers, or tapes.

In one embodiment, the article is an extrusion coating. In another embodiment, the article is a film.

It has been surprisingly discovered that by using high melt strength components of lower density, the overall achievable density in the inventive compositions is higher. This is related to the balance of component density, melt index and melt strength. It has also been discovered that the inventive compositions lead to low extractable levels, and thus could be suited for the most critical food contact applications.

The invention also provides a method for forming an inventive composition, said method comprising mixing the first ethylene-based polymer and the second ethylene-based polymer.

The invention also provides a method for forming an inventive composition, said method comprising separately feeding the first ethylene-based polymer and the second ethylene-based polymer into an extrusion system. In a further embodiment, the extrusion system comprises a compounding extruder and/or an extruder used to form a final article (for example, a coating extruder).

An inventive composition may comprise a combination of two or more embodiments as described herein.

The first ethylene-based polymer may comprise a combination of two or more embodiments as described herein.

The second ethylene-based polymer may comprise a combination of two or more embodiments as described herein.

An inventive article may comprise a combination of two or more embodiments as described herein.

An inventive method may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor). The pressure in each autoclave and tubular reactor zone of the process is typically from 100 to 400, more typically from 120 to 360, and even more typically from 150 to 320 MPa. The polymerization temperature in each tubular reactor zone of the process is typically from 100 to 400, more typically from 130 to 360, and even more typically from 140 to 330° C.

The polymerization temperature in each autoclave reactor zone of the process is typically from 150 to 300, more typically from 165 to 290, and even more typically from 180 to 280° C. One skilled in the art understands that the temperatures in the autoclave are considerably lower and less differentiated than those of the tubular reactor, and thus, more favorable extractable levels are typically observed in polymers produced in an autoclave-based reactor systems.

The first ethylene-based polymers with broad MWD are typically made at polymerization conditions comprising one or more of the following process elements:

Reduced operating pressure (versus maximum operating pressure of reactor system);

Elevated polymerization temperatures: one or more autoclave zone and/or one or more tubular reactor zone are operated at a control or maximum peak temperature exceeding respectively 240 and 290° C.;

Minimum of two reaction zones of autoclave nature; or a minimum of three reaction zones of autoclave/tubular hybrid nature or of tubular nature; and/or Selection of type and/or distribution of CTA over the reaction zones to ensure broad MWD product.

The high pressure process of the present invention to produce polyethylene homopolymers or interpolymers for compositions having the advantageous properties as found in accordance with the invention, is preferably carried out in a tubular reactor having at least three reaction zones.

Initiators

The process of the present invention is a free radical polymerization process. The type of free radical initiator to be used in the present process is not critical, but preferably one of the initiators applied should allow high temperature operation in the range from 300° C. to 350° C. Free radical initiators that are generally used include organic peroxides, such as peresters, perketals, peroxy ketones, percarbonates, and cyclic multifunctional peroxides. These organic peroxy initiators are used in conventional amounts, typically from 0.005 to 0.2 wt % based on the weight of polymerizable monomers. Other suitable initiators include azodicarboxylic esters, azodicarboxylic dinitriles and 1,1,2,2-tetramethylethane derivatives, and other components capable of forming free radicals in the desired operating temperature range.

Peroxides are typically injected as diluted solutions in a suitable solvent, for example, in a hydrocarbon solvent. In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence the molecular weight, for example, the number average molecular weight, Mn. The melt flow index (MFI or $I_2$) of a polymer, which is related to Mn, is controlled in the same way.

The chain transfer agents used in the process of this invention include, but are not limited to, aliphatic and olefinic hydrocarbons, such as pentane, hexane, cyclohexane, propene, pentene or hexene; ketones such as acetone, diethyl ketone or diamyl ketone; aldehydes such as formaldehyde or acetaldehyde; and saturated aliphatic aldehyde alcohols such as methanol, ethanol, propanol or butanol. The chain transfer agent may also be a monomeric chain transfer agent. For example, see WO 2012/057975, WO2013/095969, and WO2014/003837.

Differentiated CTA concentrations in the reaction zones can be used to achieve and to control the desired molecular weight distribution. Means to differentiate the CTA concentration in reaction zones include among others methods described in WO2013/059042, WO2011/075465 and WO2012/044504.

A further way to influence the melt index includes the build up and control, in the ethylene recycle streams, of incoming ethylene impurities, like methane and ethane, peroxide dissociation products, like tert-butanol, acetone, etc., and or solvent components used to dilute the initiators. These ethylene impurities, peroxide dissociation products, and/or dilution solvent components can act as chain transfer agents.

Additives

An inventive composition may further comprise one or more additives. Suitable additives include, but are not limited to, stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers; and oil extenders, including paraffinic or napthelenic oils. An inventive composition may comprise other polymer types.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor, or forming one polymer in the presence of another polymer).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or within a polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer and, optionally, may comprise at least one comonomer.

The term "ethylene-based interpolymer" or "ethylene interpolymer" refers to an interpolymer that comprises a majority amount of polymerized ethylene based on the weight of the interpolymer, and comprises at least one comonomer.

The term "ethylene-based copolymer" or "ethylene copolymer" refers to a copolymer that comprises a majority amount of polymerized ethylene based on the weight of the copolymer, and only one comonomer (thus, only two monomer types).

The terms "autoclave-based products" or "autoclaved-based polymers," as used herein, refer to polymers prepared in a reactor system comprising at least one autoclave reactor.

The phrase "high pressure, free-radical polymerization process," as used herein, refers to a free radical initiated polymerization carried out at an elevated pressure of at least 1000 bar (100 MPa).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Density:
Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index:
Melt index, or $I_2$, (grams/10 minutes or dg/min) is measured in accordance with ASTM D 1238, Condition 190° C./2.16 kg.

Melt Strength
Melt strength (MS) measurements were conducted on a Göttfert Rheotens 71.97 (Göttfert Inc.; Rock Hill, S.C.) attached to a Göttfert Rheotester 2000 capillary rheometer. A polymer melt (about 20-30 grams, pellets) was extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston was run at a constant piston speed of 0.265 mm/second. The standard test temperature was 190° C. The sample was drawn uniaxially to a set of accelerating nips located 100 mm below the die, with an acceleration of 2.4 mm/second$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Hexane Extractable
Polymer pellets (from the polymerization, pelletization process without further modification) were pressed in a Carver Press, at a thickness of 3.0-4.0 mils (approximately 2.2 grams of pellets pressed into a film). The pellets were pressed at 190° C., for three minutes, at 3,000 lb$_f$, and then at 190° C., for three minutes, at 40,000 lb$_f$. Non-residue gloves (PIP* CleanTeam* Cotton Lisle Inspection Gloves, Part Number: 97-501) were worn, so as to not contaminate films with residual oils from the hands of the operator. Films were cut into "1 inch×1 inch" squares, and weighed. Enough film samples were used, such that "2.5 g" of film samples were used for each extraction. The films were then extracted for two hours, in a hexane vessel containing about 1000 ml of hexane, at "49.5±0.5° C." in a heated water bath. The hexane used was an isomeric "hexanes" mixture (for example, Hexanes (Optima), Fisher Chemical, High purity mobile phase for HPLC and/or extraction solvent for GC applications, 99.9% min by GC). After two hours, the films were removed, rinsed in clean hexane, initially dried with nitrogen, and then further dried in a vacuum oven (80±5° C.) at full vacuum (ISOTEMP Vacuum Oven, Model 281A at approximately 30 inches Hg) for two hours. The films were then placed in a desiccator, and allowed to cool to room temperature for a minimum of one hour. The films were then reweighed, and the amount of mass loss due to extraction in hexane was calculated. The [(amount of mass loss/initial weight of film)×100]=the weight percent of hexane extractable.

EXPERIMENTAL

Figure 1B:
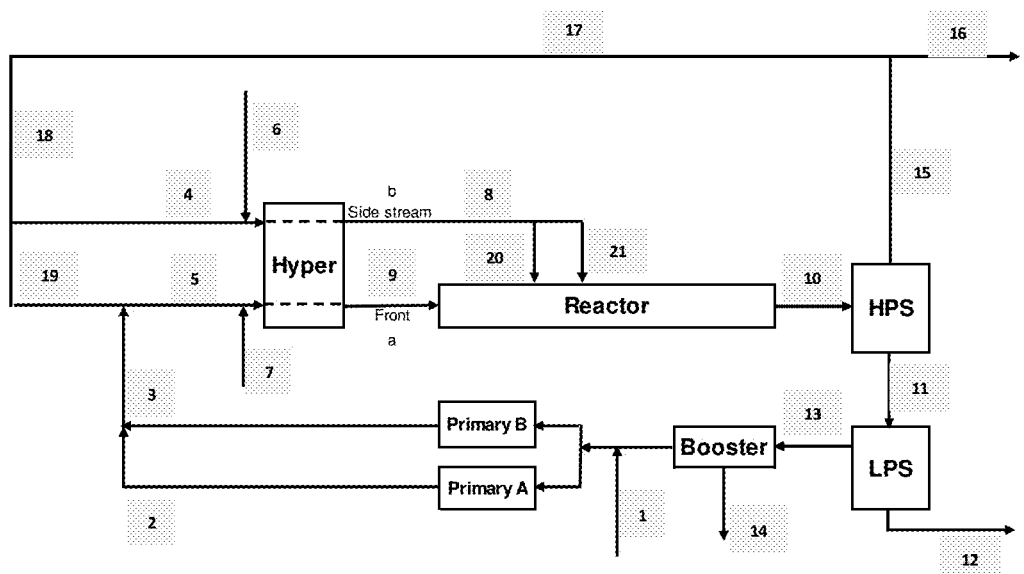

A. First Ethylene-Based Polymers
E1
The polymerization was carried out in tubular reactor with three reaction zones. In each reaction zone, pressurized water was used for cooling and/or heating the reaction medium, by circulating this water through the jacket of the reactor. The inlet-pressure was 2100 bar, and the pressure drop over the whole tubular reactor system was about 300 bars. Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. Thus, the maximum, potential amount of incorporated acetylene in the polymer was less than 20 mole ppm, based on the total moles of monomeric units in the ethylene-based polymer (see conversion level in Table 3). The non-converted ethylene, and other gaseous components in the reactor outlet, were recycled through a high pressure and a low pressure recycle system, and were compressed and distributed through a booster, a primary compressor system and a hyper (secondary) compressor system, according to the flow scheme shown in FIG. 1B. As seen in FIG. 1B, that both discharge streams (2 and 3) of the primary compressor were sent to the reactor front feed stream 5. Organic peroxides were fed into each reaction zone (see Table 1). Propionaldehyde (PA) was used as a chain transfer agent, and it was present in each reaction zone inlet, originating from the low pressure and high pressure recycle flows (13 and 15), as well as from freshly injected CTA make-up stream 7 and/or stream 6. The polymer was made at a melt index of 1.5 g/10 min.

After reaching the first peak temperature (maximum temperature) in reaction zone 1, the reaction medium was cooled with the help of the pressurized water. At the outlet of the reaction zone 1, the reaction medium was further cooled by injecting a fresh, cold, ethylene-rich feed stream (20), and the reaction was re-initiated by feeding an organic peroxide. This process was repeated at the end of the second reaction zone, to enable further polymerization in the third reaction zone. The polymer was extruded and pelletized (about 30 pellets per gram), using a "single screw" extruder system at a melt temperature around 230-250° C. The weight ratio of the ethylene-rich feed streams (9:20:21) to the three reaction zones was 1.00:0.75:0.25. The R2 and R3 values each approached infinity ($\infty$). The R values are calculated according to International Publication WO 2013/059042 (International Patent Application PCT/US12/059469, filed Oct. 10, 2012). Rn (n=reaction zone number, n>1) is the ratio of "mass fraction of fresh ethylene fed to the first reaction zone (RZ1)" to "mass fraction of fresh ethylene fed to the nth reaction zone (RZn)" or Rn=RZ1/RZn. The internal process velocity was approximately 12.5, 9 and 11 m/sec, respectively, for the first, second, and third reaction zones. In this polymerization, the weight ratio of the CTA make-up streams 7 and 6 was 0.09. Additional information can be found in Tables 2 and 3.

E2

The polymerization was carried out in a tubular reactor with three reaction zones, as discussed above for E1 (see FIG. 1B). The weight ratio of the ethylene-rich feed streams (9:20:21) to the three reaction zones was 1.00:0.76:0.24. The polymer was made at a melt index of 0.58 g/10 min. The R2 and R3 values each approached infinity ($\infty$). In this inventive example, the weight ratio of the CTA make-up streams 7 and 6 was 2. Additional information can be found in Tables 2 and 3. The CTA was propionaldehyde (PA).

E3

The polymerization was carried out in tubular reactor with three reaction zones, as discussed above for E1 (see FIG. 1B). The weight ratio of the ethylene-rich feed streams (9:20:21) to the three reaction zones was 1.00:0.76:0.24. The polymer was made at a melt index of 0.37 g/10 min. The R2 and R3 values each approached infinity ($\infty$). In this inventive example, the weight ratio of the CTA make-up streams 7 and 6 was 1.35. Additional information can be found in Tables 2 and 3. The CTA was propionaldehyde (PA).

In summary, to achieve tubular resins with high melt strength, suitable as a blend component in extrusion coating compositions, typically together with a low or lower melt strength component, the polymerization conditions need to be selected and balanced; for example, as shown above Important process parameters include maximum polymerization temperatures, inlet reactor pressure, conversion level, and the type, level and distribution of the chain transfer agent.

TABLE 1

Initiators

| Initiator | Abbreviation |
|---|---|
| tert-butyl peroxy-2-ethyl hexanoate | TBPO |
| di-tert-butyl peroxide | DTBP |
| 3,6,9-triethyl-3,6,9-trimethyl-1,4,7-peroxonane | TETMP |

TABLE 2

Pressure and Temperature Conditions (Inventive Examples)

| LDPE | Inlet-pressure/ bar | Start-temp./° C. | reinitiation temp. 2nd zone/° C. | reinitiation temp. 3rd zone/° C. | 1st Peak temp./° C. | 2nd Peak temp./° C. | 3rd Peak temp./° C. |
|---|---|---|---|---|---|---|---|
| E1 | 2100 | 140 | 163 | 248 | 336 | 330 | 309 |
| E2 | 2100 | 140 | 169 | 243 | 330 | 325 | 299 |
| E3 | 2100 | 140 | 173 | 243 | 327 | 323 | 299 |

TABLE 3

First Ethylene-based Polymers

| LDPE | Peroxides | CTA | I2 dg/min | R2 and R3 Value | Ethylene Conversion % |
|---|---|---|---|---|---|
| E1 | TBPO/DTBP/TETMP | PA | 1.5 | $\infty$ | 32.3 |
| E2 | TBPO/DTBP/TETMP | PA | 0.58 | $\infty$ | 29.3 |
| E3 | TBPO/DTBP/TETMP | PA | 0.37 | $\infty$ | 27.6 |

Additional first ethylene-based polymers are shown in Table 4.

TABLE 4

First Ethylene-based Polymers

| Material | | I2 (dg/min) | MS (cN) | Density (g/cc) | Hexane Extractable or Extract (wt %) |
|---|---|---|---|---|---|
| LDPE 770G* | LDPE | 2.3 | 14.8 | 0.9180 | 1.5 |
| LDPE 662I* | LDPE | 0.38 | 30.0 | 0.9182 | 1.8 |
| E1 | LDPE | 1.5 | 19.2 | 0.9172 | 3.9 |
| E2 | LDPE | 0.58 | 26.8 | 0.9180 | 2.6 |
| E3 | LDPE | 0.37 | 29.9 | 0.9180 | 2.5 |

*Polymers available from The Dow Chemical Company.

B. Second Ethylene-Based Polymers

Table 5 shows properties of selected ethylene-based polymers, including second ethylene-based polymers and other polymers.

TABLE 5

Second Ethylene-based Polymers and Other Polymers

| Material | | I2 (dg/min) | MS (cN) | Density (g/cc) | Hexane Extractable or Extract (wt %) |
|---|---|---|---|---|---|
| LDPE 751A* | LDPE | 6.4 | 2.5 | 0.9255 | 2.3 |
| LDPE 421E* | LDPE | 3.1 | 5.5 | 0.930*** | 1.2 |
| LDPE 748I* | LDPE | 7.3 | 2.1 | 0.9198 | 2.2 |
| LDPE 5004I* | LDPE | 4.1 | 8.2 | 0.9234 | 1.4 |
| LDPE 4005* | LDPE | 4.3 | 9.2 | 0.9197 | 1.8 |
| XZ89139.00** | LDPE | 4.0 | 5.3 | 0.9285 | 0.92 |
| LDPE 722* | LDPE | 8.0 | 8.2 | 0.9183 | 1.9 |

*Polymers available from The Dow Chemical Company.
**LDPE XZ89139.00 (autoclave-based resin) available from the Dow Chemical Company. For a description of this resin see *13th TAPPI European PLACE Conference—30 May to 1st June 2011 at Bregenz, Austria* "PE Extrusion Coating Resin Design Tools," by C. Zuercher et al.; pp. 1-22).
***Target density.

C. Representative Preparation of Inventive Compositions

Blend formulations are listed in Tables 6-9. The blend components were compounded using an "18 mm" twin screw extruder (micro-18). The twin screw extruder was a Leistritz machine controlled by HAAKE software. The extruder had five heated zones, a feed zone, and a "3 mm" strand die. The feed zone was cooled by flowing water, while the remaining zones 1-5 and the die were electrically heated and air cooled to 120, 135, 150, 190, 190, and 190° C., respectively. The pelletized polymer components were combined in a plastic bag, and tumble blended by hand. After preheating the extruder, the load cell and die pressure transducers were calibrated. The drive unit for the extruder was run at 200 rpm, which resulted, by gear transfer, to a screw speed of 250 rpm. The dry blend was then fed (6-8 lbs/hr) to the extruder through a twin auger K-Tron feeder (model #K2VT20) using pellet augers. The hopper of the feeder was padded with nitrogen, and the feed cone to the extruder was covered with foil, to minimize air intrusion, to minimize possible oxygen degradation of the polymer. The resulting strand was water quenched, dried with an air knife, and pelletized with a CONAIR chopper.

A first set of blend compositions was made using LDPE 751A with either LDPE 770G or E1 in various blend ratios. It was discovered that these compositions reached medium density target levels at melt indices favorable for extrusion coating, while achieving a melt strength comparable to autoclave LDPE coating grades at similar densities. Properties of the inventive compositions are shown in Table 6.

TABLE 6

Properties of Compositions (each percent in wt %)

| Example | Polymers | I2 (dg/min) | Density (g/cc) | MS (cN) |
|---|---|---|---|---|
| 1 (Inv.) | 80% LDPE 751A + 20% 770G | 5.2 | 0.9232 | 6.6 |
| 2 (Inv.) | 80% LDPE 751A + 20% E1 | 5.2 | 0.9233 | 7.0 |
| 3 (Inv.) | 70% LDPE 751A + 30% E1 | 4.0 | 0.9218 | 8.2 |
| 4 (Inv.) | 60% LDPE 751A + 40% E1 | 3.7 | 0.9218 | 9.0 |
| a (Comp.) | LDPE 5004I | 4.1 | 0.9234 | 8.2 |

A second set of blend compositions was made using LDPE 421E with LDPE 6621 in various blend ratios. It was discovered that these compositions reached even higher density levels at melt indices favorable for extrusion coating, while achieving a high melt strength. Properties of the inventive composition are shown in Table 7.

TABLE 7

Properties of Compositions (each percent in wt %)

| Example | Polymers | I2 (dg/min) | Density (g/cc) | MS (cN) |
|---|---|---|---|---|
| 5 (Inv.) | 90% LDPE 421E + 10% LDPE 662I | 2.5 | 0.9286 | 8.1 |
| 6 (Inv.) | 80% LDPE 421E + 20% LDPE 662I | 2.1 | 0.9279 | 10.0 |
| a (Comp.) | LDPE 5004I | 4.1 | 0.9234 | 8.2 |

A third set of blend compositions was made using LDPE 751A with either LDPE 6621, E2, or E3 at a fixed blend ratio. It was discovered that these compositions reached medium density target levels at melt indices and melt strengths favorable for extrusion coating. Properties of the inventive compositions are shown in Table 8.

TABLE 8

Properties of Compositions (each percent in wt %)

| Example | Polymers | I2 (dg/min) | Density (g/cc) | MS (cN) | Hexane Extractable or Extract (wt %)* |
|---|---|---|---|---|---|
| 7 (Inv.) | 75% LDPE 751A + 25% LDPE 662I | 3.1 | 0.9239 | 9.1 | 1.9 |
| 8 (Inv.) | 75% LDPE 751A + 25% E2 | 3.2 | 0.9245 | 8.8 | 2.5 |
| 9 (Inv.) | 75% LDPE 751A + 25% E3 | 2.8 | 0.9236 | 10.0 | 2.4 |
| a (Comp.) | LDPE 5004I | 4.1 | 0.9234 | 8.2 | 1.4 |

*calculated from % Extr = $w_1$ * % $Extr_1$ + (1 − $w_1$) * % $Extr_2$. Here, w1 refers to the first ethylene-based polymer.

A fourth set of blend compositions was made using LDPE 7481 with LDPE 6621 in various blend ratios. These compositions did not reach target density levels at melt indices and melt strengths favorable for extrusion coating. Properties of the comparative compositions are shown in Table 9.

TABLE 9

Properties of Compositions (each percent in wt %)

| Example | Polymers | I2 (dg/min) | Density (g/cc) | MS (cN) |
|---|---|---|---|---|
| b (Comp.) | 90% LDPE 748I + 10% LDPE 662I | 5.4 | 0.9207 | 4.8 |
| c (Comp.) | 80% LDPE 748I + 20% LDPE 662I | 4.3 | 0.9199 | 6.7 |
| a (Comp.) | LDPE 5004I | 4.1 | 0.9234 | 8.2 |

Figure 2:
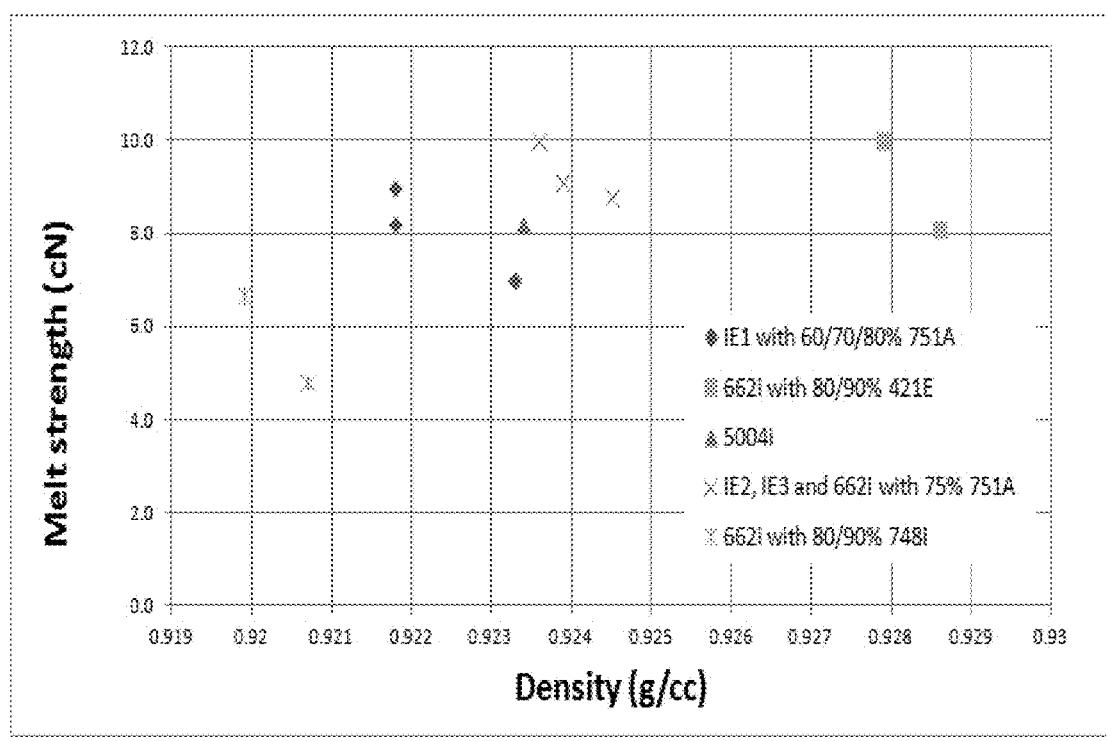
FIG. 2 depicts the "Melt Strength (MS) versus density" for some inventive and comparative compositions.

FIG. 2 shows the density and melt strength data of the compositions of Tables 5-8. It was found that the following blend rules for I2, density, and MS provide a good fit to the blend data for all these inventive and comparative compositions:

$$\log(I2) = w_1 * \log(I2_1) + (1-w_1) * \log(I2_2)$$

$$1/\text{density} = w_1/\text{density}_1 + (1-w_1)/\text{density}_2$$

$$MS = w_1 * MS_1 + (1-w_1) * MS_2$$

Figure 3:
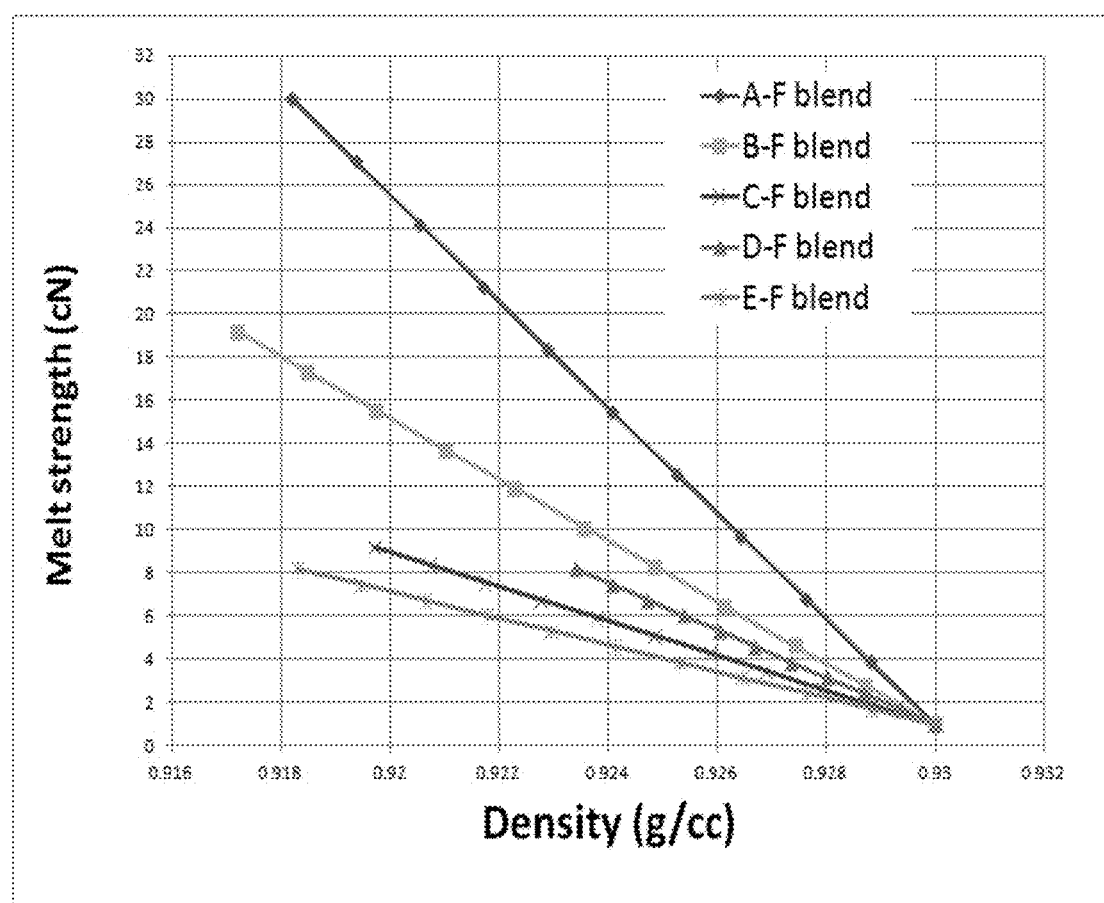
FIG. 3 depicts the "Melt Strength (MS) versus density" for some inventive and comparative compositions.
Figure 4:
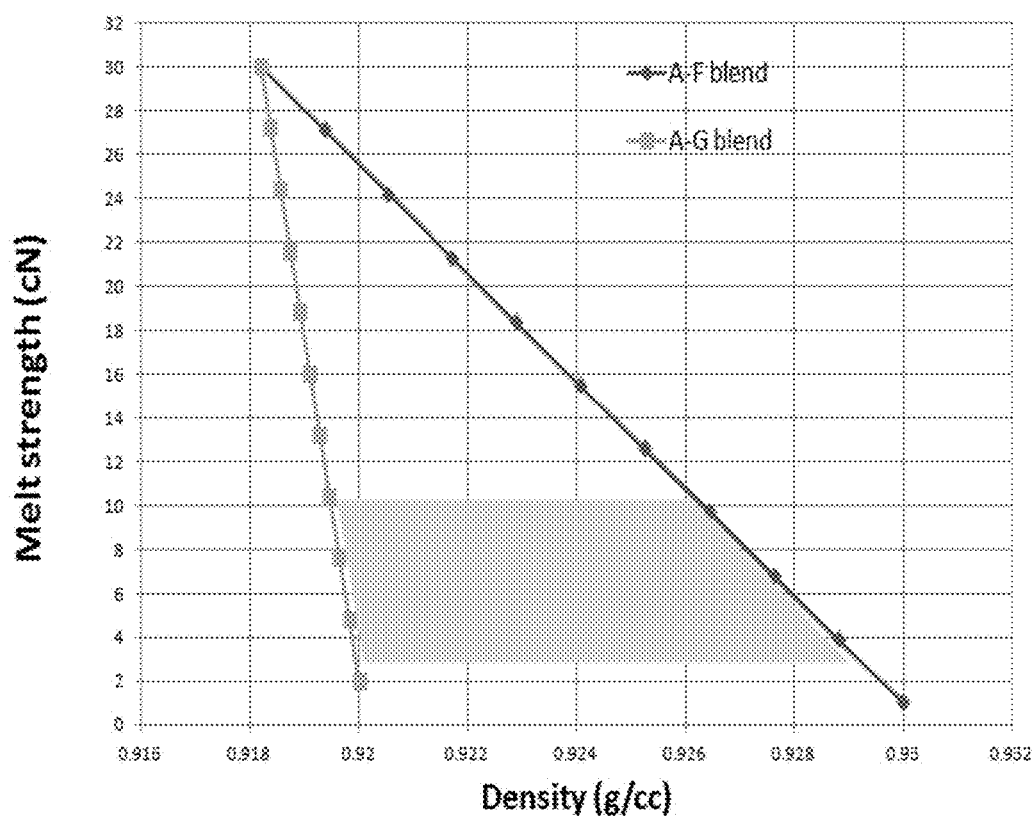
FIG. 4 depicts the "Melt Strength (MS) versus density" for some inventive and comparative compositions.

In these equations the suffix 1 and 2 refer to component 1 and 2 respectively. The property $w_1$ is the weight fraction of component 1 in the blend. For this study, component 1 refers to the first ethylene-based polymer. These blend rules are used to calculate the effect of blend ratio and of the properties of the components on the properties of the composition. Table 10 lists a selection of components used for such calculations. The components are selected based on commercial materials and theoretical LDPE resins. Table 11 provides selected calculations of certain component combinations, at calculated weight fractions, to achieve certain target melt strength values. FIGS. 3 and 4 show calculated melt strength and density for selected component combinations for the entire blend ratio spectrum, from $w_1=0$ to $w_1=1$.

In each of FIG. 3 and FIG. 4, the highest density data point (furthest right) on each line (profile) represents that of the second ethylene-based polymer (a blend containing no first ethylene-based polymer). Each consecutive data point on each line, from the highest density data point, represents a blend containing a 10 weight percent increase in the amount of the first ethylene-based polymer, based on the weight of the first ethylene-based polymer and the second ethylene-based polymer. This "10 weight percent increase" is relative to the previous data point to the right of the data point at issue. Thus, as one moves from right to left across the data points on each line, the amount of first ethylene-based polymer in the blend increases from 0, 10, 20, 30, 40, 50, 60, 70, 80, 90 and 100 weight percent, based on the weight of the first ethylene-based polymer and the second ethylene-based polymer.

It has been surprisingly discovered that higher densities can be achieved in the inventive compositions containing high melt strength components of lower density. This is related to the balance of component density, melt index and melt strength. Furthermore, it has been discovered, as shown in the tables and figures herein, that for a minor adjustment to the weight fraction (blend ratio) of each component, a significant variation in melt index and melt strength (hence, in coating performance such as draw down and neck-in) can be achieved, with a minimum variation in density of the composition, using a low density, high melt strength first component. In contrast, when using a conventional high melt strength component as the first ethylene-based polymer, which is of higher melt index and lower melt strength than the first ethylene-based polymer of an inventive composition, a higher blend ratio is needed to achieve a suitable coating performance. Adjustment of the coating performance (draw down and neck-in) requires a large change in blend ratio, resulting in a larger variation in the final blend density.

Furthermore, the tables and figures show that the attainable final density is higher in the inventive compositions, because a much lower blend ratio is needed to achieve a good coating performance. Further density and melt index differentiation in the composition can be achieved by variation in the major blend component (second ethylene-based polymer). See FIG. 4, which demonstrates the flexibility of this inventive approach. Furthermore, it has been discovered that using a low melt index, high melt strength component enables selecting a second component with a very high melt index. Some representative calculation examples are shown in Table 12.

TABLE 10

Selected components for blend calculations

| Ethylene-based Polymer | LDPE | I2 (dg/min) | Density (g/cc) | Melt Strength (cN) |
|---|---|---|---|---|
| A | 662I | 0.38 | 0.9182 | 30 |
| B | E1 | 1.5 | 0.9172 | 19.2 |
| C | 4005 | 4.3 | 0.9197 | 9.2 |
| D | 5004I | 4.1 | 0.9234 | 8.2 |
| E | 722 | 8.0 | 0.9183 | 8.2 |
| F* | 7MI, 0.930d | 7.0 | 0.9300 | 1.0 |
| G* | 7MI, 0.920d | 7.0 | 0.9200 | 2.0 |

*Theoretical determinations of I2, density and Melt Strength.

TABLE 11

Representative Blend Calculations

| Component 1 First Ethylene-based Polymer | Component 2 Second Ethylene-based Polymer | weight fraction comp2 | I2 (dg/min) | Density (g/cc) | Melt Strength (cN) | Composition |
|---|---|---|---|---|---|---|
| A | F | 0.930 | 5.7 | 0.9292 | 3.0 | inventive |
| B | F | 0.890 | 5.9 | 0.9286 | 3.0 | inventive |
| C | F | 0.760 | 6.2 | 0.9275 | 3.0 | comparative |
| D | F | 0.720 | 6.0 | 0.9281 | 3.0 | comparative |
| E | F | 0.720 | 7.3 | 0.9267 | 3.0 | comparative |
| A | G | 0.965 | 6.3 | 0.9199 | 3.0 | comparative |
| A | F | 0.895 | 5.2 | 0.9287 | 4.0 | inventive |
| B | F | 0.835 | 5.4 | 0.9279 | 4.0 | inventive |
| C | F | 0.640 | 5.9 | 0.9263 | 4.0 | comparative |
| D | F | 0.590 | 5.6 | 0.9273 | 4.0 | comparative |
| E | F | 0.590 | 7.4 | 0.9252 | 4.0 | comparative |
| A | G | 0.930 | 5.7 | 0.9199 | 4.0 | comparative |
| A | F | 0.863 | 4.7 | 0.9284 | 5.0 | inventive |
| B | F | 0.780 | 5.0 | 0.9272 | 5.0 | inventive |
| C | F | 0.510 | 5.5 | 0.9249 | 5.0 | comparative |
| D | F | 0.450 | 5.2 | 0.9264 | 5.0 | comparative |
| E | F | 0.450 | 7.5 | 0.9235 | 5.0 | comparative |
| A | G | 0.893 | 5.1 | 0.9198 | 5.0 | comparative |

TABLE 12

Selected inventive examples of high melt index split between components

| weight fraction Component 2 | I2 (dg/min) Component 1 | Density (g/cc) Component 1 | MS (cN) Component 1 | I2 (dg/min) Component 2 | Density (g/cc) Component 2 | MS (cN) Component 2 | I2 (dg/min) Blend | Density (g/cc) Blend | MS (cN) Blend |
|---|---|---|---|---|---|---|---|---|---|
| 0.65 | 1.5 | 0.9172 | 19.2 | 20 | 0.9300 | 0.1 | 8.1 | 0.9255 | 6.8 |
| 0.65 | 0.58 | 0.9180 | 26.8 | 33 | 0.9300 | 0.1 | 8.0 | 0.9258 | 9.4 |
| 0.65 | 0.37 | 0.9180 | 29.9 | 42 | 0.9300 | 0.1 | 8.0 | 0.9258 | 10.5 |

D. Extrusion Coatings

Monolayer extrusion coatings were performed on a Black-Clawson extrusion coating/lamination line for the third set of blend compositions (see Table 8). An extruder with 150 horsepower and 3.5 inch diameter screw was used, at screw speeds of approximately 90 rpm, resulting in 114 kg/h (250 lb/h) polymer output. Temperature in each zone of the extruder was 177, 232, 288, and 316° C. (350, 450, 550 and 600° F.), respectively, leading to a target melt temperature of 320° C. The nominal die width of 76 cm (30 inches) was deckled to an open die width of 61 cm (24 inches). The width of the Kraft paper was 61 cm (24 inches). A "15 cm" air gap was used, with line speeds of 134 m/min (440 fpm) and 268 m/min (880 fpm), resulting in 25 micron (1 mil) and 13 micron (0.5 mil) coatings respectively. Neck-in and draw-down were determined as follows: Draw down is defined as the maximum line speed attainable before web breakage or web defects/edge inconsistencies occur, when accelerating the line speed at a constant polymer output. Neck-in is the difference between the final width of the web and the die width at fixed line speed. Lower neck-in and higher draw down are both very desirable. Lower neck-in indicates better dimensional stability of the web, which, in turn, provides for better control of the coating onto the substrate. Higher draw down indicates higher line speed capability, which, in turn, provides for better productivity.

The maximum speed used was 457 m/min (1500 fpm). Blends of the various components were produced by weighing out the pellets, and then tumble blending samples, until a homogeneous blend was obtained (approximately 30 minutes for each sample). Neck-in and draw down results are shown in Table 13.

It has been discovered that these blends lead to satisfactory coating performance, comparable to the benchmark LDPE 5004I. One skilled in the art can further optimize the neck-in/draw-down balance by adjusting the blend ratio and/or by selection of the first and second ethylene-based polymers.

TABLE 13

Extrusion coating properties of blend compositions

| | Blend composition | Neck-in 320° C.; 25 micron; 134 m/min (cm) | Neck-in 320° C.; 13 micron; 268 m/min (cm) | Draw-down 320° C. (m/min)* |
|---|---|---|---|---|
| 7 (Inv.) | 75% LDPE 751A + 25% 662I | 4.8 | Not measured | 259 |
| 8 (Inv.) | 75% LDPE 751A + 25% E2 | 7.3 | 6.4 | >457 |
| 9 (Inv.) | 75% LDPE 751A + 25% E3 | 6.4 | 5.4 | 405 |
| a (Comp.) | LDPE 5004I | 5.7 | 4.8 | >457 |

*Starting at a coating thickness of 13 micron at 268 m/min line speed.

The invention claimed is:

1. A composition comprising a first ethylene-based polymer, formed by a high pressure, free-radical polymerization process, and a second ethylene-based polymer, formed by a high pressure, free-radical polymerization process, such composition comprising the following properties:

a) a melt index (I2) from 2.0 to 10 dg/min;

b) a density from 0.922 to 0.935 g/cc; and wherein the second ethylene-based polymer is present in an amount from 60 to 95 weight percent, based on the sum of the weight of the first ethylene-based polymer and the second ethylene-based polymer; and wherein the second ethylene-based polymer has a density greater than, or equal to, 0.924 g/cc; and wherein the first ethylene-based polymer has a melt index less than 1.5 dg/min.

2. The composition of claim 1, wherein the first ethylene-based polymer has a Melt Strength greater than, or equal to, 15 cN.

3. The composition of claim 1, wherein the second ethylene-based polymer has a melt index from 2.0 to 50 dg/min.

4. The composition of claim 1, wherein the second ethylene-based polymer has a melt index from 3.0 to 30 dg/min.

5. The composition of claim 1, wherein the composition has a hexane extractable content less than 5.5 wt %.

6. The composition of claim 1, wherein the composition has a hexane extractable content less than 2.6 wt %.

7. The composition of claim 1, wherein the first ethylene-based polymer and the second ethylene-based polymer each independently has a hexane extractable content less than, or equal to, 2.6 wt %.

8. The composition of claim 1, wherein each polymer component of the composition independently has a hexane extractable content less than, or equal to, 2.6 wt %.

9. An article comprising at least one component formed from the composition of claim 1.

10. The article of claim 9, wherein the article is a coating, a film, a foam, a laminate, a fiber, or a tape.

11. A method for forming the composition of claim 1, said method comprising mixing the first ethylene-based polymer and the second ethylene-based polymer.

12. A method for forming the composition of claim 1, said method comprising separately feeding the first ethylene-based polymer and the second ethylene-based polymer into an extrusion system.

* * * * *